W. B. HUGHES.
HEAT INDICATING DEVICE.
APPLICATION FILED MAR. 9, 1910.
1,034,798.
Patented Aug. 6, 1912.
2 SHEETS—SHEET 1.
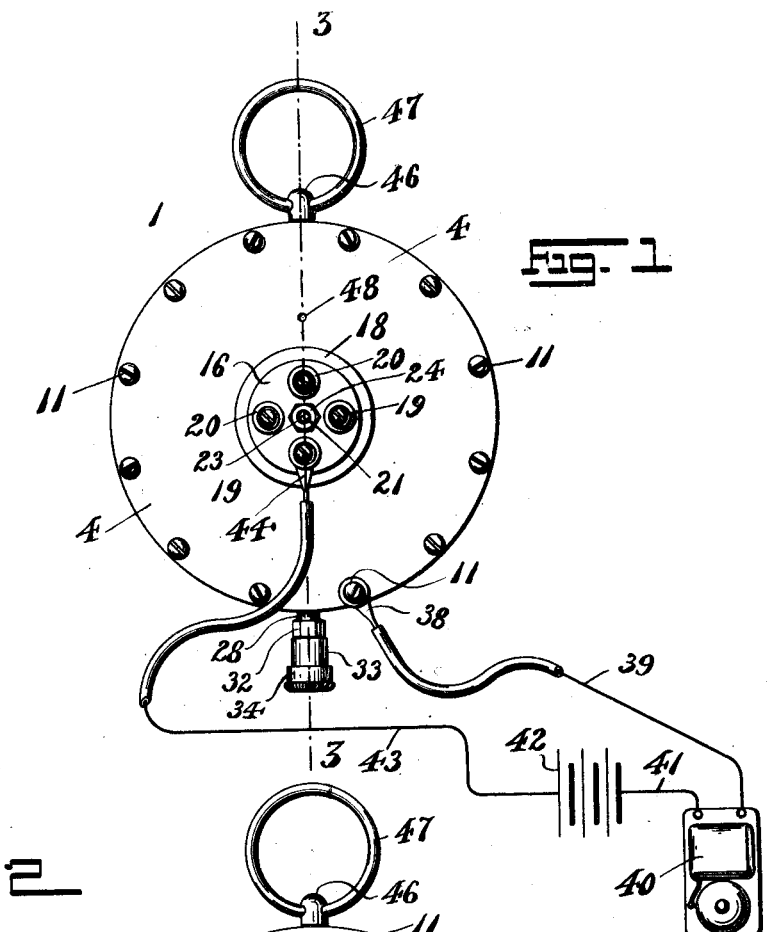
Fig. 1.
Fig. 2.
WITNESSES:
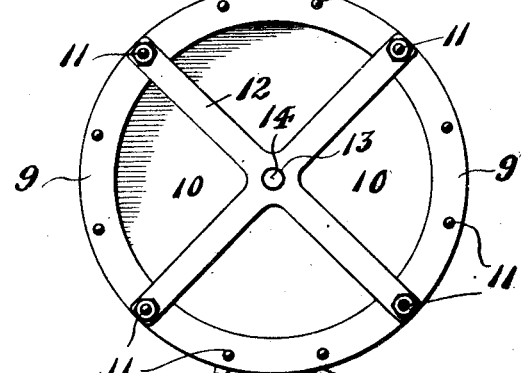
INVENTOR
William B. Hughes,
BY
Fraenzel and Richards
ATTORNEYS

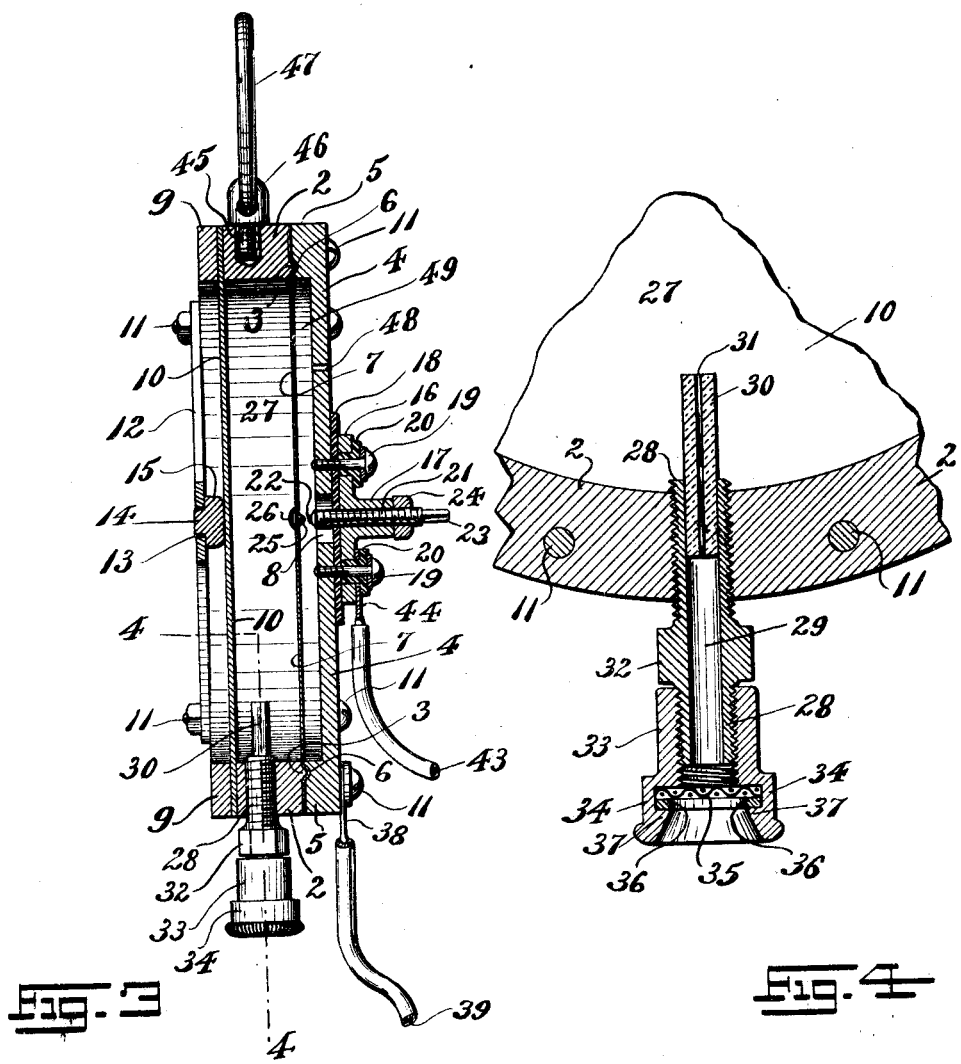

UNITED STATES PATENT OFFICE.

WILLIAM B. HUGHES, OF NEWARK, NEW JERSEY.

HEAT-INDICATING DEVICE.

1,034,798.  Specification of Letters Patent.  Patented Aug. 6, 1912.

Application filed March 9, 1910. Serial No. 548,133.

*To all whom it may concern:*

Be it known that I, WILLIAM B. HUGHES, a citizen of the United States, residing at Newark, in the county of Essex and State of New Jersey, have invented certain new and useful Improvements in Heat-Indicating Devices; and I do hereby declare the following to be a full, clear, and exact description of the invention, such as will enable others skilled in the art to which it appertains to make and use the same, reference being had to the accompanying drawings, and to characters of reference marked thereon, which form a part of this specification.

The present invention relates, generally, to improvements in electric fire-alarms or heat indicating devices; and, the invention has reference, more particularly, to a novel device or apparatus which is automatic in its operation in closing an electric circuit to sound an alarm when the said device or apparatus is subjected to abnormal heat, but which maintains the said electric circuit interrupted or broken under a wide variation of normal temperature.

The present invention, therefore, has for its principal object to provide a novel and simply constructed device or implement, which normally maintains an electric circuit interrupted or broken, but, which in case of fire, or the generation of excessive or sudden heat, is caused to act automatically to close said electric circuit whereby an alarm may be sounded to give warning. The said device or apparatus may be used also in connection with any well known type of alarm and indicator so that in large buildings the exact location of the fire may be ascertained.

Another object of the present invention is to provide in connection with a device or apparatus of the character above set forth, a means for adjusting the contact members thereof to regulate the sensitiveness of the said device or apparatus.

A still further object of the present invention is to provide in connection with the said novel device or apparatus a means for compensating for the normal fluctuation of temperature so that the device, will not operate under normal and gradual rises of heat, but only when the increase of heat is excessive or sudden.

Other objects of this invention not at this time more particularly enumerated will be clearly understood from the following detailed description of my present invention.

With the various objects of my present invention in view, the invention consists, primarily, in the novel device or apparatus of the general character hereinafter more fully specified; and, the invention consists, furthermore, in the novel arrangements and combinations of the various devices and parts, as well as in the details of the construction of the same, all of which will be more fully described in the following specification and then finally embodied in the clauses of the claim which are appended to and which form an essential part of this specification.

The invention is clearly illustrated in the accompanying drawings, in which:

Figure 1 is a face view of the novel device or apparatus embodying the principle of my present invention; and Fig. 2 is an opposite face view thereof. Fig. 3 is a vertical longitudinal section of the said novel device or apparatus, the said section being taken on line 3—3 in said Fig. 1, and the same being drawn on an enlarged scale. Fig. 4 is a detail transverse section taken on line 4—4 in said Fig. 3, this view being drawn upon an enlarged scale.

Similar characters of reference are employed in all of the hereinabove described views to indicate corresponding parts.

Referring now to the several figures of the drawings, the reference-character 1 indicates a complete novel device or apparatus embodying the principles of my present invention, the same comprising a ring-shaped body-member 2, provided upon one of its side faces with an annular rib 3.

The reference-character 4 indicates a cover or plate, the same being provided with an annular extending flange or ring 5. The said flange or ring is provided upon its outer face with a groove 6 corresponding in position with the said annular rib 3 of the body member 2, so that the said rib 3 will dovetail into the said groove 6. In the drawings, the said cover or plate 4 is shown as though made of metal, but under certain conditions it may be advisable to make the same of some insulating material, such as hard rubber or fiber. Therefore, I do not limit the same as being made of metal. Arranged between the said body-member 2 and the said ring or flange 5 is a thin diaphragm 7, the same being made of metal, preferably of copper. The said diaphragm 7 is drawn over said annular rib 3 by means of the grooves 6 of said flange or ring 5 to tautly stretch the same in its normal position. The said cover or plate is further provided with a centrally disposed hole or perforation 8. The reference-character 9 indicates a ring-member adapted to be arranged upon the opposite face of said body member 2. Secured between said body-member 2 and said ring-member 9 is another diaphragm 10, preferably made of metal, such as copper or the like, but of a heavier gage or thickness than the afore-mentioned diaphragm, 7, the various parts above described are combined and drawn together by the screws 11. Secured upon the outer face of said ring-member 9 is a cross-strut or spider 12, the same being provided with a centrally disposed hole or perforation 13. Arranged in said hole or perforation 13 is a shank 14 of a button 15, the inner face of said button bearing against the said diaphragm 10. The said cross-strut or spider 12 and its button 15 prevents the diaphragm from expanding or moving outwardly when acted upon by heat. Secured in a central location and registering with its said hole or perforation 8 upon said cover or plate 4 is a contact-support 16, the same being provided with an outwardly extending boss 17. The said contact-support 16 is insulated from said cover or plate 4 by means of an insulator piece 18, and said contact-support is secured in its fixed position by means of screws 19, the said screws also being insulated from said contact-support by means of the flanged insulator-sleeves 20. Arranged in said contact-support is a screw-threaded contact 21, provided at its inner end with a contact point 22, preferably made of platinum, and at its outer end with a square head 23 for turning the same to adjust the position of said contact point 22. The inner end of said contact point penetrates or passes through the perforation or hole 8 of said cover or plate 4. Arranged upon the outer end of said contact pin 21 is a lock-nut 24 for locking the same in its adjusted position. Secured upon said diaphragm 7 in such a position as to be opposite the contact point 22 is another contact point 25, preferably made of platinum, the same being secured by riveting to the diaphragm 7. The exposed head of the rivet thus formed is covered with soft solder 26 to make the joint perfectly air-tight. The reference-character 27 indicates an air space inclosed by said body-member 22 and the respective diaphragms 7 and 10. The reference character 48 indicates a small hole or perforation in the cover or plate 4 leading into an air-space 49 between said diaphragm 7 and said cover or plate 4. This vent thus formed by the hole or perforation 48 provides a means for compensating for any contraction or expansion of the air in said space 49. Arranged so as to screw into said body-member 2 is a screw-threaded nipple-portion 28 provided with a longitudinally extending opening or duct 29. Secured in the inner end of said opening or duct is a tubular member 30, the same being provided with a longitudinal opening or duct 31 of a very slight diameter. Said nipple-portion 28 is further provided between its ends with a nut-like shoulder 32 for manipulating the same when it is desired to screw said nipple-portion into said body-member 2. Secured upon the outer end of said nipple-portion 28 is an open cap-like member 33, which is provided at its outer end with an enlarged chambered portion 34. Arranged within this chambered portion is a fabric-screen 35, and a washer 36 for holding it in place. The inner periphery 37 of the walls of said chambered portion 34 is milled or crushed down around said washer 36 so as to retain the same in its holding position. Secured in electrical contact with one of said screws 11 and thus in electrical contact with said diaphragm 7 is the terminal-piece 38, of a wire-conductor 39, the same leading to an electric alarm-bell 40, or other indicator. Said alarm bell is connected by means of the conductor or circuit 41 with one pole of a battery 42, or any other suitable source of electricity. The other pole of said battery 42 is connected to a wire-conductor 43; the terminal piece 44 of which is secured in electrical contact with said contact-support 16 by means of one of the screws 19, but insulated from said screw by one of the flanged insulator-sleeves 20. Secured in said body-member 2 is a shank 45 of the perforated head 46 in which is arranged a ring 47, by means of which the said device or apparatus may be suspended in any desirable location in a room or other desired place.

Having thus described the general construction of the novel device or apparatus providing the automatic fire-alarm, I will now describe the method of its operation. When the device is subjected to excessive or some rising temperature, the heat striking the exposed surface of the diaphragm 10, raises the temperature of the same, and causes it to communicate the heat to the air retained in the space 27. The heat thus communicated to the air in said space 27 causes the same to expand, and this expansion of the air exerts a pressure upon the thin diaphragm 7, pressing the same outwardly until its contact point 25 engages the contact point 22, thus closing an interrupted electric circuit, as will be clearly apparent from an inspection of the drawings. When the circuit is thus closed, the electric current passes through the battery 42 by way of the wire-conductor 43 and terminal piece 44 into the contact-support 16 and contact- pin 21 to the contact point 22. The contact point 25 touching the contact point 22 of the contact pin 21, the electric current is now carried into the diaphragm 7 and thence through one of the screws 11 to the terminal piece 38 and the wire 39 to the alarm bell 40, and thence by the wire-conductor 41 back into the battery 42, thus completing the circuit.

It will be readily understood, that the device may be made more or less sensitive by moving the contact point 22 closer or farther away from the diaphragm 7 and its contact point 25, so that the same can be regulated to cause the device to operate more or less quickly.

In order that it may be assured that the automatic circuit-closing means will not operate under normal fluctuations of temperature, which are generally slow or gradual in change, the safety-escape mechanism provided by the nipple-portion 28 and its connected parts operates to allow the air in the space 27 which is expanded by the gradual rising of temperature to very gradually escape, so that the expansion of the air in said space 27 is compensated for in proportion to the slow rise of temperature, and thus preventing any pressure by means of expanded air being exerted upon the diaphragm 7, whereby the same is caused to carry the contact point 25 in engagement with the contact point 22.

I claim:

1. A device for automatically closing an electric circuit when subjected to excessive or sudden heat comprising a body-member, a ring-member arranged upon one face of said body-member, a cover or plate arranged upon the opposite face of said body-member, diaphragms arranged respectively between said body-member and said ring-member and said body-member and said cover or plate, said body-member and said diaphragms providing an inclosed air-chamber between said diaphragms, a contact-point connected with one of said diaphragms, means for adjustably supporting another contact-point in position to be engaged by said contact-point on said diaphragm, and means for insulating said contact-points from each other when in their disengaged or normally separated positions, substantially as and for the purposes set forth.

2. In a device for automatically closing an electric circuit when subjected to excessive or sudden heat, the combination with a body-member, of diaphragms arranged therewith to form an inclosed air-chamber, an electrical circuit make and break means operated by the expansion of the air in said air-chamber, and means for permitting the escape of the expanded air in said air-chamber when the device is subjected to normal fluctuations of temperature, comprising a nipple-portion entering said air-chamber, a tubular-member connected with the inner end of said nipple-portion, said tubular member being provided with a longitudinal opening of very slight diameter, an open cap-member connected with the outer end of said nipple-portion, a fabric-screen arranged in said open cap-member, and means for retaining said fabric-screen in position, substantially as and for the purposes set forth.

3. In a device of the character described, the combination with a body-member, of diaphragms arranged therewith to form an inclosed air-chamber, and means for permitting the escape of the expanded air in said air-chamber when the device is subjected to normal fluctuations of temperature, comprising a nipple-portion entering said air-chamber, a tubular-member connected with the inner end of said nipple-portion, said tubular member being provided with a longitudinal opening of very slight diameter, an open cap-member connected with the outer end of said nipple portion, a fabric screen arranged in said open cap-member, and means for retaining said fabric-screen in position, substantially as and for the purposes set forth.

In testimony, that I claim the invention set forth above I have hereunto set my hand this 7th day of March, 1910.

WILLIAM B. HUGHES.

Witnesses:
FREDK. C. FRAENTZEL,
FREDK. H. W. FRAENTZEL.